United States Patent [19]

Whitkop

[11] Patent Number: 4,890,389
[45] Date of Patent: Jan. 2, 1990

[54] CUTTER GUARD

[76] Inventor: George H. Whitkop, 10 Ridge Rd., East Longmeadow, Mass. 01028

[21] Appl. No.: 320,545

[22] Filed: Mar. 8, 1989

[51] Int. Cl.$^4$ .............................................. A01G 3/06
[52] U.S. Cl. ........................................ 30/276; 30/286; 30/347
[58] Field of Search ........................ 30/276, 347, 286; 56/12.7; 144/251 R

[56] References Cited

U.S. PATENT DOCUMENTS

| | | | |
|---|---|---|---|
| 3,483,905 | 12/1969 | Lawrence | 144/251 R |
| 4,049,059 | 9/1977 | Weibling | 30/276 X |
| 4,711,055 | 12/1987 | Mickos | 83/397 X |

*Primary Examiner*—Douglas D. Watts
*Assistant Examiner*—Rinaldi Rada
*Attorney, Agent, or Firm*—Jerry T. Kearns

[57] ABSTRACT

A guard for a power trimming device of the type having a rotating cutting element partially enclosed about a short arcuate extent by a housing is formed from a rigid bar having a generally circular configuration with an open front portion formed by outwardly flared ends. A plurality of transverse apertures extend through the bar opposite the open front portion and receive threaded fasteners which secure the guard to the housing. The front portion of the guard allows trimming of brush and other vegetation, but protects fence posts, tree trunks and the like from damage through contact with the cutting element. The guard also provides an additional protection against injury to an operator. In a second embodiment, a compound adjustable bracket is utilized to secure the guard to the trimming device.

2 Claims, 3 Drawing Sheets

CUTTER GUARD

BACKGROUND OF THE INVENTION

1. Field of the Invention

The present invention relates to cutter guards, and more particularly pertains to a new and improved guard for a power trimming device of the type having a rotating cutting element partially enclosed about a short arcuate extent by a housing. The guard of the present invention may be utilized on trimming devices utilizing either a rigid cutting blade or a flexible string cutting element. The conventional trimming devices have a rearwardly facing guard which provides minimal protection to the operator from contact with the rotating cutting element. Additionally, the exposed front and side portions of the cutting element allow contact and damage to fence posts, tree trunks, and other items. In order to overcome these problems, and still allow sufficient access to closely trim vegetation from around other objects, the present invention provides an improved cutter guard having an open front portion formed by outwardly flared ends.

2. Description of the Prior Art

Various types of cutter guards are known in the prior art. A typical example of such a cutter guard is to be found in U.S. Pat. No. 3,831,278, which issued to H. Voglesonger on Aug. 27, 1974. This patent discloses a string type trimming device having a generally circular housing with downwardly depending side walls. U.S. Pat. No. 4,162,575, which issued to G. Ballas on July 31, 1979, discloses a string trimming device including a spool for supplying a quantity of line. U.S. Pat. No. 4,561,180, which issued to C. Pittinger et al on Dec. 31, 1985, discloses a similar device having a rearwardly facing housing which partially encloses the string trimming elements about a short arcuate extent. The front and side portions of the cutting element remain exposed. U.S. Pat. No. 4,631,828, which issued to R. Burnett on Dec. 30, 1986, discloses a similar device having a rearwardly directed housing which encloses a chain cutting element about a short arcuate extent. The front and side portions of the circular cutting path remain exposed allowing potential injury to an operator and damage to both the cutting element and various other items. U.S. Pat. No. 4,651,422, which issued to R. Everts on Mar. 24, 1987, discloses a guard for a string type trimmer formed as a short arcuate arm extending from the cutter housing.

While the above mentioned devices are directed to cutter guards, none of these devices disclose the provision of a generally circular guard having an open front portion formed by outwardly flared ends and provided with a plurality of transverse apertures for securing the guard to the housing of a rotary trimmer. Additionally, none of the aforementioned devices disclose a compound adjustable mounting bracket for securing a guard to a rotary trimmer. Inasmuch as the art is relatively crowded with respect to these various types of cutter guards, it can be appreciated that there is a continuing need for and interest in improvements to such cutter guards, and in this respect, the present invention addresses this need and interest.

SUMMARY OF THE INVENTION

In view of the foregoing disadvantages inherent in the known types of cutter guards now present in the prior art, the present invention provides an improved cutter guard. As such, the general purpose of the present invention, which will be described subsequently in greater detail, is to provide a new and improved cutter guard which has all the advantages of the prior art cutter guards and none of the disadvantages.

To attain this, representative embodiments of the concepts of the present invention are illustrated in the drawings and make use of a guard for a power trimming device of the type having a rotating cutting element partially enclosed about a short arcuate extent by a housing which is formed from a rigid bar having a generally circular configuration with an open front portion formed by outwardly flared ends. A plurality of transverse apertures extend through the bar opposite the open front portion and receive threaded fasteners which secure the guard to the housing. The front portion of the guard allows trimming of brush and other vegetation, but protects fence posts, tree trunks and the like from damage through contact with the cutting element. The guard also provides an additional protection against injury to an operator. In a second embodiment, a compound adjustable bracket is utilized to secure the guard to the trimming device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cutter guard which has all the advantages of the prior art cutter guards and none of the disadvantages.

It is another object of the present invention to provide a new and improved cutter guard which may be easily and efficiently manufactured and marketed.

- It is a further object of the present invention to provide a new and improved cutter guard which is of a durable and reliable construction.

An even further object of the present invention is to provide a new and improved cutter guard which is susceptible of a low cost of manufacture with regard to both materials and labor, and which accordingly is then susceptible of low prices of sale to the consuming public, thereby making such cutter guards economically available to the buying public.

Still yet another object of the present invention is to provide a new and improved cutter guard which provides in the apparatuses and methods of the prior art some of the advantages thereof, while simultaneously overcoming some of the disadvantages normally associated therewith.

Still another object of the present invention is to provide a new and improved cutter guard for power trimming devices having a rotating cutting element partially enclosed about a short arcuate extent by a housing, to prevent injury to an operator and damage to surrounding objects.

Yet another object of the present invention is to provide a new and improved cutter guard for power trimming devices which protects front and side portions of the cutting path, while allowing sufficient access for the close trimming of vegetation.

Even still another object of the present invention is to provide a new and improved cutter guard which utilizes a compound mounting bracket for adjustable securement to a rotary trimming device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
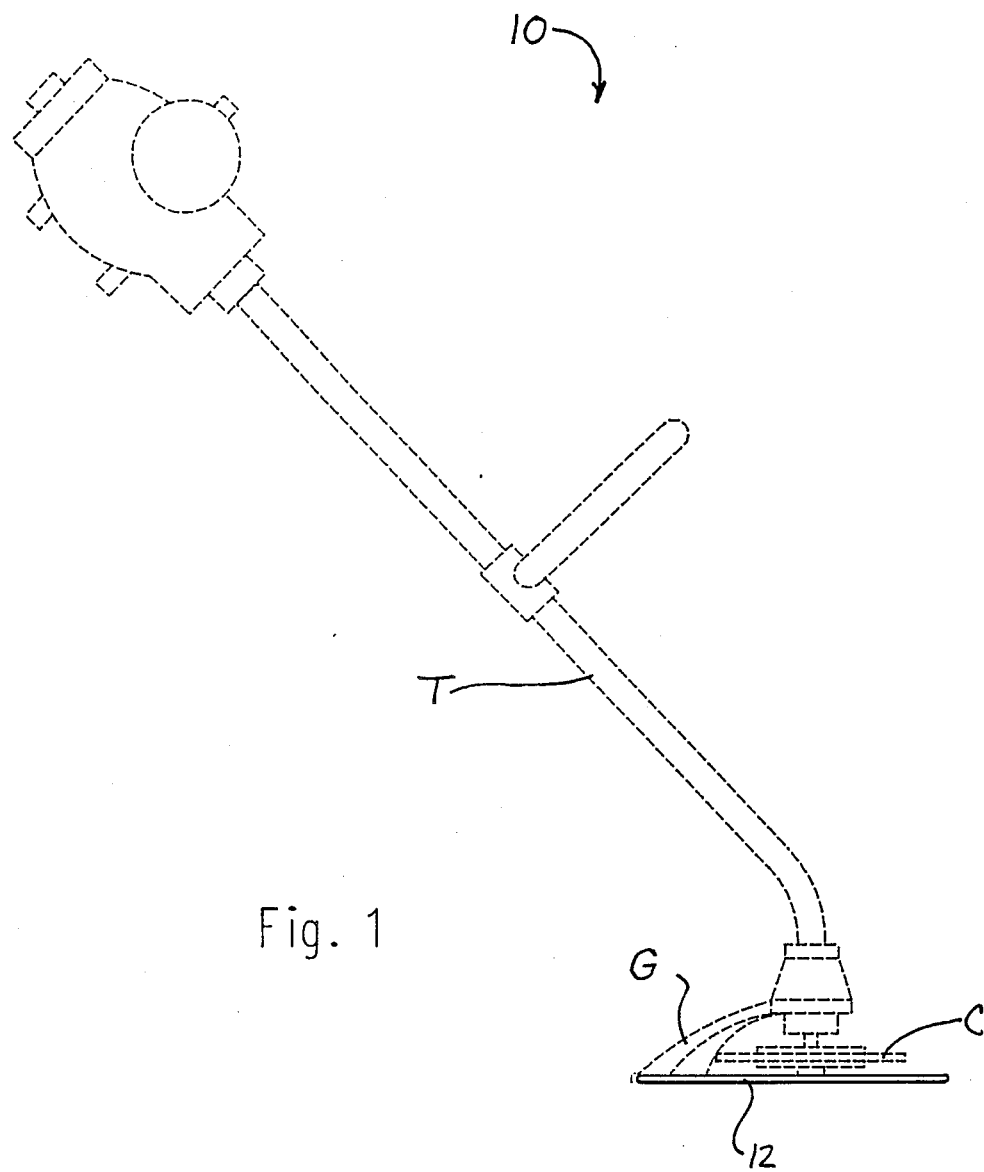
FIG. 1 is a side view illustrating the guard of the present invention secured on a conventional rotary trimming device.

With reference now to the drawings, and in particular to FIG. 1 thereof, a new and improved cutter guard embodying the principles and concepts of the present invention and generally designated by the reference numeral 10 will be described.

More specifically, it will be noted that the first embodiment 10 of the invention includes a guard 12 secured to the conventional guard G or housing of a conventional rotary trimming device T having a cutting element C driven in a circular path. The cutting element C may be of the type which utilizes a rigid cutting blade or may be of the type which utilizes a string cutting element. In either case, the conventionally existing guard G encloses the circular path of the cutting element C about a rearwardly directed short arcuate extent, leaving the side and front portions of the circular cutting path completely exposed. The present invention overcomes this deficiency by enclosing the front and side portions of the cutting path with a generally circular guard 12 formed from a rigid steel bar which is secured to the existing guard G.

Figure 2:
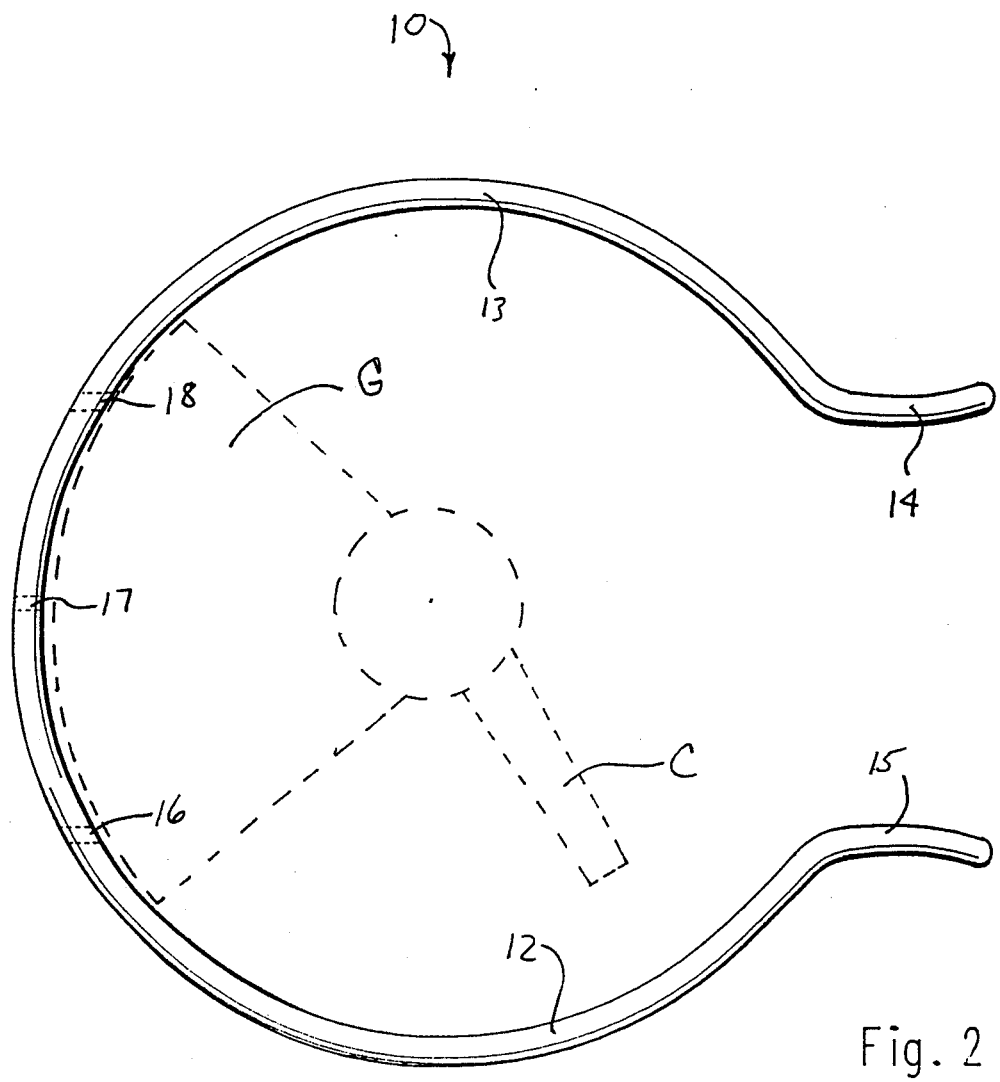
FIG. 2 is a plan view illustrating the guard of the present invention.

FIG. 2 is a plan view in which the conventional existing guard G and cutting element C have been diagrammatically illustrated. The guard 10 of the present invention includes opposite circular side wall portions 12 and 13 which terminate in outwardly flared ends 14 and 15, forming an open front portion. A plurality of transverse apertures 16, 17 and 18 are formed through the bar, opposite the open front portion and receive threaded fasteners which secure the guard 10 to the existing guard G of the trimming device. As may now be understood, the side wall portions 12 and 13 of the guard 10 serve as an abutment which prevents damage to upstanding items such as fence posts and the legs of an operator. The outwardly flared ends 14 and 15 provide a front opening which allows close trimming of vegetation, but still prevents inadvertent exposure of the cutting element C.

Figure 3:
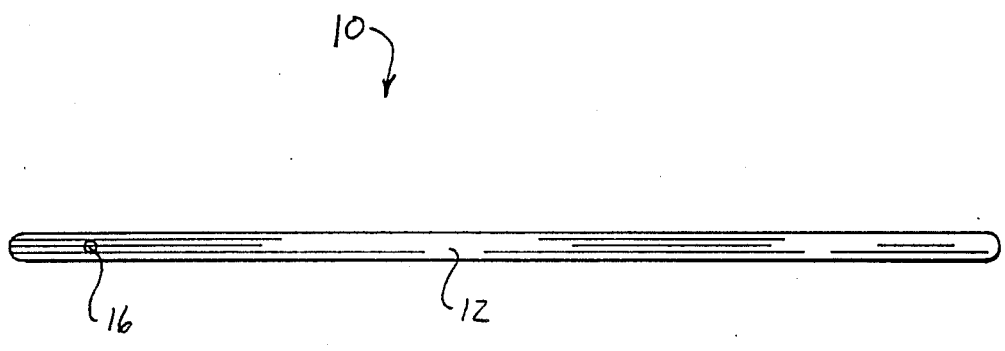
FIG. 3 is a side view illustrating the guard of the present invention.

FIG. 3 illustrates a side view of the guard 10 according to the first embodiment of the present invention.

Figure 4:
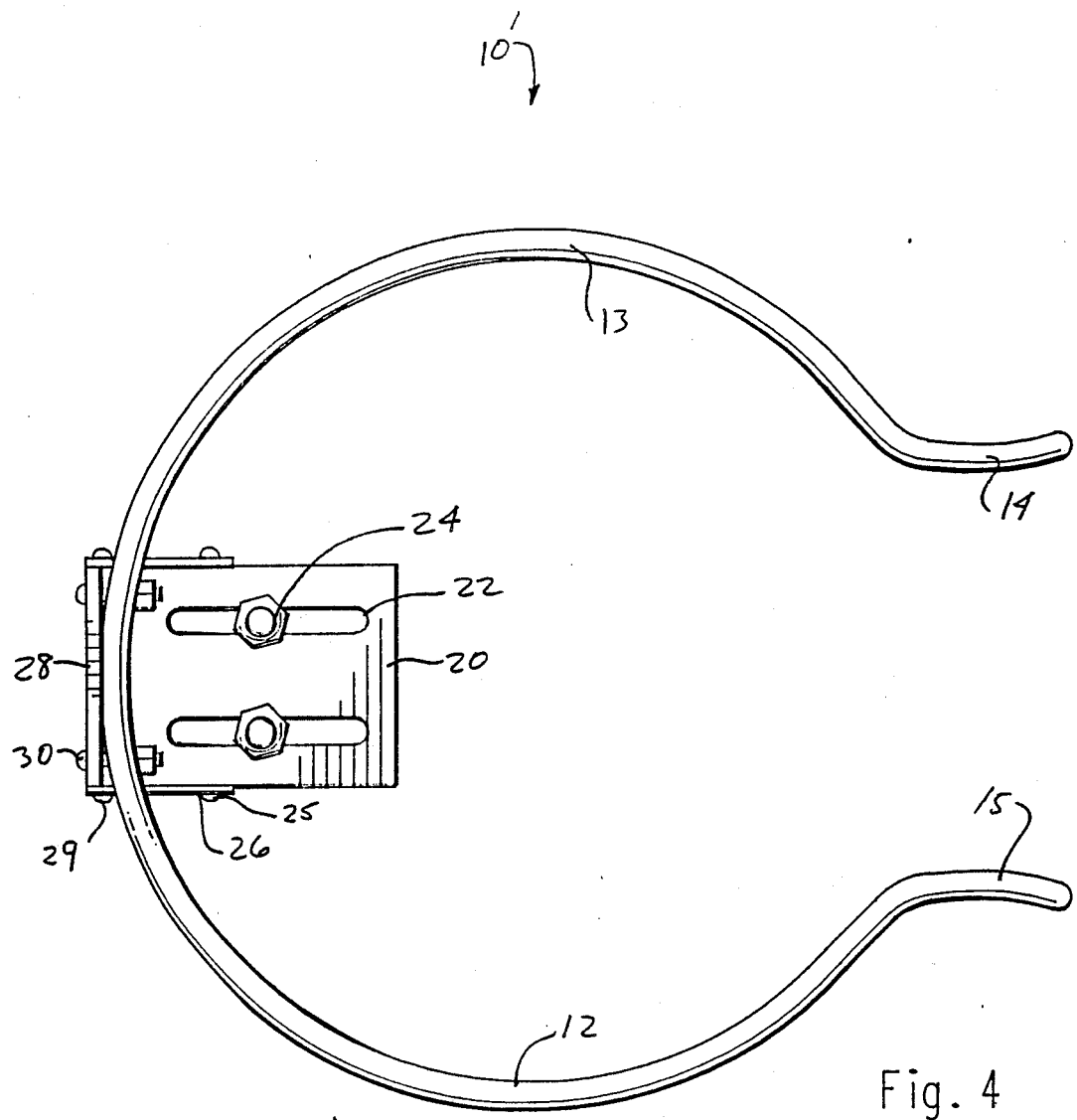
FIG. 4 is a plan view illustrating the guard according to a second embodiment of the present invention, including a compound adjustable mounting bracket.

FIG. 4 is a plan view which illustrates a guard 10' according to a modified form of the invention. A compound adjustable mounting bracket is provided for securing the guard 10' to the conventionally existing cutter housing. The bracket includes a first plate 20 having a pair of elongated slots 22 each receiving a threaded fastener 24 for adjustably securing the first plate 20 to the conventional cutter guard o housing. A second plate 28 is pivotally connected by a hinge to the first plate 20 and an arcuate guide 26 has a first end secured by a rivet 25 to the first plate 20. The opposite end of the arcuate guide has an arcuate slot engaged with a clamp screw 29 secured to the second plate 28.

Figure 5:
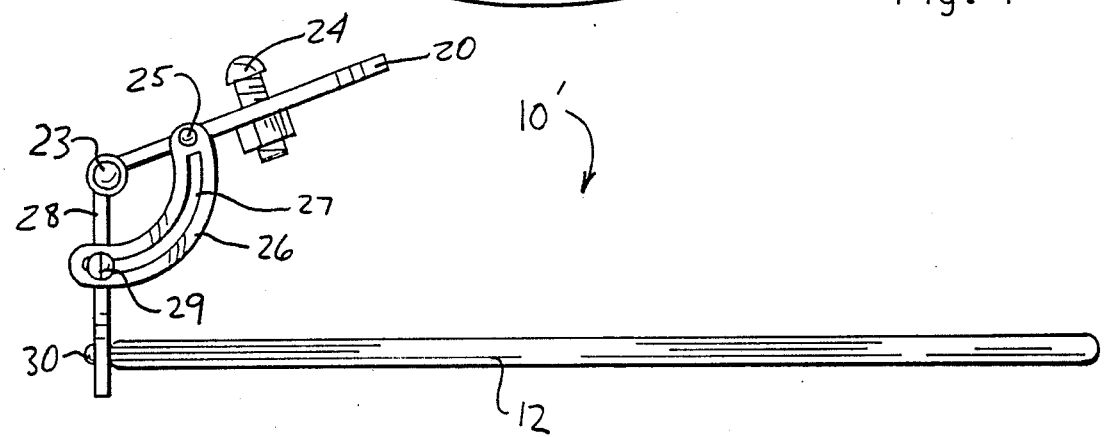
FIG. 5 is a side view of the guard of FIG. 4.

FIG. 5 is a side view which illustrates the arcuate guide 26 and the arcuate slot 27 formed therein which receives the clamp screw 29 on the second plate 28. The hinge 23 pivotally mounts the second plate 28 to the first plate 20. The back portion of the circular guard is secured to the second plate 28 by a plurality of threaded fasteners 30. As may now be understood, this arrangement provides a compound adjustable mounting for the circular guard allows adjustable positioning of the guard for various different cutting operations.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. In a power trimming device having a rotating cutting element partially enclosed about a short arcuate extent by a housing, the improvement comprising:
   a generally circular guard formed from a rigid bar and secured to said housing, said guard surrounding said cutting element and having an open front portion formed by outwardly flared ends;
   an adjustable mounting bracket securing said guard to said housing, said mounting bracket including:
   a first plate having at least one elongated slot receiving a threaded fastener for adjustably securing said first plate to said housing;
   a second plate pivotally connected to said first plate;
   an arcuate guide having a first end secured to said first plate, said arcuate guide having an arcuate slot receiving a clamp screw engaged with said second plate for securing said second plate in a pivotally adjusted position;
   and
   fastening means securing said guard to said second plate.

2. A cutter guard for a power trimming device having a rotating cutting element partially enclosed about a short arcuate extent by a housing, comprising:
   a generally circular guard formed from a rigid bar and having an open front portion formed by outwardly flared ends; an adjustable mounting bracket for securing said guard to said housing, said mounting bracket including:
   a first plate having at least one elongated slot receiving a threaded fastener for adjustably securing said first plate to said housing;
   a second plate pivotally connected to said first plate;
   an arcuate guide having a first end secured to said first plate, said arcuate guide having an arcuate slot receiving a clamp screw engaged with said second plate for securing said second plate in a pivotally adjusted position;
   and
   fastening means securing said guard to said second plate.

* * * * *